July 2, 1968     R. JACKSON     3,391,232
FORMING PROCESS REGULATION
Filed Aug. 12, 1964
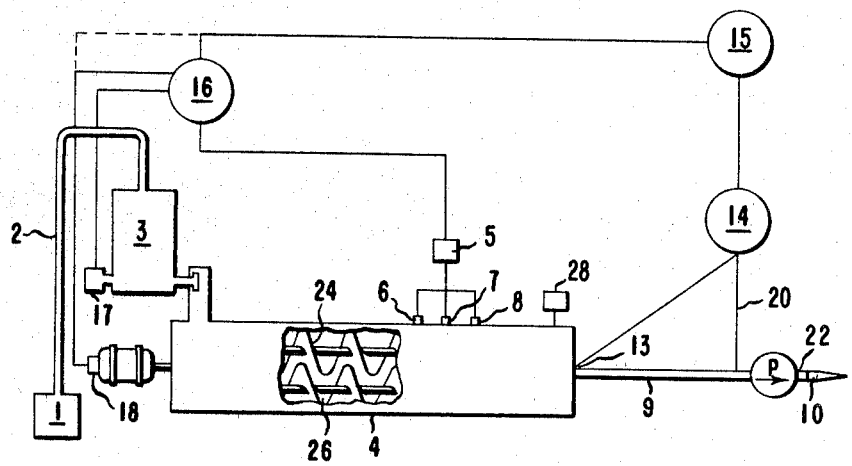
INVENTOR
ROY JACKSON
BY *Frank R. Ortolani*
ATTORNEY

United States Patent Office

3,391,232
Patented July 2, 1968

3,391,232
FORMING PROCESS REGULATION
Roy Jackson, Coolkeeragh, Londonderry, Northern Ireland, assignor to E. I. du Pont de Nemours and Company, Wilmington, Del., a corporation of Delaware
Filed Aug. 12, 1964, Ser. No. 388,988
3 Claims. (Cl. 264—40)

ABSTRACT OF THE DISCLOSURE

A process for regulating a continuous polymer extrusion process to maintain a desired level of relative viscosity and subsequent product uniformity by using the extruder pressure as the control parameter. The rate at which polymer flake is fed to the extruder and the extruder screw speed are simultaneously adjusted in proportion to the extruder outlet pressure.

---

This invention relates to a new and improved process and apparatus for the manufacture of extruded products from nylon and other fusible polymers.

It is known that filaments, films, tubing, and other extruded products can be produced from fusible polymers by feeding the polymer material into a screw-type extruder, kneading the polymer in the molten state as it passes through the extruder, and passing the molten polymer through shaping means (e.g., an extrusion die or spinneret assembly) and through cooling means. But the known extrusion processes are not entirely satisfactory for many applications. For example, in the production of nylon filaments, it is often necessary to subject the polymer to costly and time-consuming treatment to obtain and/or to maintain a desired level of relative viscosity (molecular weight) before it is suitable for being fed to the extruder. Such treatments are difficult to regulate, and they are not very adaptable to continuous manufacturing procedures. Moreover, there is a tendency towards depolymerization within the extruder which makes it difficult to produce products of uniform characteristics and high quality.

The process of this invention is defined broadly as follows: A process for manufacturing extruded products from a fusible polymer which comprises continuously feeding a fusible polymer into a screw-type extruder, maintaining the polymer in a molten state in the extruder at a selected temperature, continuously kneading the molten polymer intensively in the extruder, continuously passing the kneaded molten polymer through a pressure-melt inventory zone extending to near the exit port of the extruder, and continuously passing the polymer out of the exit port of the extruder through a spinneret, extrusion die, or other means adapted to give the extruded product the desired shape, characterized in that the kneaded molten polymer is continuously passed through a vacuum zone (subatmospheric pressure) upstream from the pressure zone, volatile matter is continuously removed from the extruder through a vent port in the vacuum zone, the inlet and outlet pressures in the pressure melt inventory zone are continuously measured, and the rate at which polymer is fed into the extruder and the screw speed are both continuously regulated in such proportion to the outlet pressure that said pressure is maintained substantially constant, and the melt inventory therein is maintained sufficient for the desired extrusion.

The apparatus of this invention comprises a screw-type extruder equipped with a polymer inlet near one end and a polymer outlet (exit port) near the other end of the extruder, means to feed polymer into the polymer inlet, means to maintain the polymer in a molten state in the extruder at any selected temperature, means to knead the molten polymer intensively in the extruder, a pressure zone near the exit port of the extruder, a vacuum zone upstream from the pressure zone containing a vent port through which volatile matter can be removed from the extruder, flow restriction means between the vacuum and pressure zones, means to give the extruded product the desired shape as it leaves the extruder, means for continuously detecting the outlet pressure in the pressure zone, and regulating means cooperative with said pressure detector for continuously regulating both the extruder screw speed and the rate at which polymer is fed into the polymer inlet in such proportion to said pressure that said pressure is maintained substantially constant.

One form of the novel apparatus is illustrated in the accompanying drawing which shows the apparatus diagrammatically in side elevation. The drawing is explained in detail in Example 1 below.

The fusible polymers which can be fed into the extruder according to the novel process are exemplified as follows: nylons (polyamides), polyesters (e.g., polyethylene terephthalate), olefins (e.g., polyethylene and polypropylene), vinyons (e.g., polyvinyl chloride), polymethyl methacrylate, cellulose acetate, polyoxymethylene polymers, and copolymers as well as mixtures of such polymers. Especially advantageous results are obtained when the polymer is a long-chain synthetic polymer having a relative viscosity (molecular weight) that is below the optimum for the application intended and having the capacity to increase in relative viscosity when volatile matter is removed therefrom while the polymer is kneaded in the molten state.

Additives can be blended with the polymer either before the polymer is fed into the extruder or while it is being kneaded therein. For example, additives can be injected through one or more special inlet ports in the extruder barrel at a point upstream from the vacuum zone. Useful additives are well known in the art and include such materials as antioxidants, antistatic agents, stabilizers, coloring agents, filament surface-rougheners, fillers, dye assistants, plasticizers, and lubricants. The additives do not have to be entirely free of water or other volatile matter when added to the polymer since any unwanted volatile content can be removed in the vacuum zone of the extruder.

The polymer can be fed into the extruder in any convenient form including molten form, as well as such solid forms as flakes, fibers, cubes, and powder. Fresh polymer, previously extruded polymer, or blends thereof can make up the polymer feed.

The extruder contains at least one screw or equivalent means operable to rotate on its axis within the barrel of the extruder, to move the polymer through the barrel of the extruder, and to knead the polymer intensively during such movement. Particularly suitable are extruders having two or more intermeshing screws; for example, extruders of the type described in U.S. Patents 2,670,188 and 2,814,472. Such extruders, of course, must be provided with the vacuum zone, pressure regulating means, and other features described herein.

The heat regulating means of the extruder is operated at a temperature sufficient to maintain the polymer within the extruder in a molten state at a temperature selected according to conventional considerations such as polymer characteristics and processing conditions.

The polymer within the extruder is intensively kneaded in the molten state at a regulated screw speed (speed of rotation of the one or more screws). The mechanical energy input is determined by the screw speed as well as by the polymer viscosity and screw design.

Upstream from the pressure zone the polymer passes through a vacuum zone. Water vapor, glycols, monomers or other volatile matter liberated from the polymer composition during the kneading operation is removed from the extruder through one or more vent ports in the vacuum zone. For example, the relative viscosity of nylon can be adjusted to a predetermined value by regulating the amount of water vapor removed from the molten nylon through the vacuum zone vent ports as the nylon continues to polymerize during the kneading and water is liberated by this condensation reaction. If too much volatile matter is allowed to accumulate in the extruder, the reaction will be reversed with a resulting decrease in relative viscosity of the polymer. The subatmospheric pressure in the vacuum zone can be maintained by attaching the vent ports to a tube leading to a steam jet or other known means of producing vacuum. The level of vacuum and the number and size of vent ports are adjusted according to the amount of volatile matter to be removed. A pressure seal between vent ports permits devolatilization in stages. The pressure (which governs polymer inventory) in the pressure zone that follows the vacuum zone is kept low at its inlet or upstream and to prevent the polymer from flooding the vent ports.

In the pressure zone through which the polymer passes between the vacuum zone and the exit port of the extruder, a pressure detector continuously measures the pressure. The pressure at the entry to this zone is kept substantially constant at a level low enough to prevent flooding of the vent ports. In order to maintain the pressure at a suitable constant level, the screw speed and the rate at which polymer is fed into the extruder are both continuously regulated according to the reading on the outlet pressure detector. Thus, a slight increase in the pressure reading immediately calls for a proportionate decrease in the screw speed and feed rate, and therefore melt inventory control is effected.

One skilled in the art of polymer extrusion will have little difficulty in selecting a satisfactory level of pressure to be maintained in the pressure zone. Factors in the choice of the degree of pressure to be maintained include the viscosity of the molten polymer, screw design, design of the interior surface of the extruder barrel, design of any attachments downstream from the exit port through which the polymer travels, and, as mentioned above, prevention of flooding of the vent ports. The pressure selected in typical fiber-spinning operations will often be within the range of 400 to 1400 p.s.i. (28 to 98 kg./cm.$^2$). In a typical nylon fiber spinning operation, a pressure between 650 p.s.i. (45.5 kg./cm.$^2$) and 1000 p.s.i. (70 kg./cm.$^2$) has been found to be very suitable.

The screw speed must be regulated to the extent required for keeping the pressure in the pressure zone substantially constant. Also, the screw speed must be sufficient to provide the mechanical energy input required for intensively kneading the polymer and sufficient to deliver the desired amount of polymer to the spinneret or extrusion die. When spinning nylon fiber according to the novel process, a mechanical energy input of about 4000 to 7500 ft. lbs./min./lb./hr. (251 to 471 kg. m./min./kg./hr.) is usually suitable.

In the preferred manner of practicing the invention, an automatic regulating device is used to regulate the screw speed. A pressure regulator is set at a predetermined pressure which has previously been found to be satisfactory for the polymer and apparatus being used in a brief trial run. Signals continuously transmitted from the pressure detector to the pressure regulator are relayed through a ratio regulator to the speed regulator for the kneading screws, and any deviation from the desired constant pressure causes a proportionate change in screw speed sufficient to restore the pressure level to the preset value.

The rate at which polymer is fed into the extruder can be regulated automatically in the manner just described wherein the pressure signals relayed through the ratio regulator actuate the speed regulator for the feeder. Gravimetric and volumetric feeders capable of feeding solid or molten polymers into extruders at a constant rate are known in the art. Equivalent regulation of the rate of feed can be accomplished by having the speed regulator of the feeder actuated directly by the speed regulator of the kneader screws so that any change in screw speed causes a directly proportional change in feed rate.

It is also within the scope of the invention to transmit the signals from the pressure detector to two separate pressure regulators, one of which regulates the screw speed and the other regulates the feed rate. This arrangement can be modified by using a separate pressure detector for each pressure regulator.

The molten polymer passes through the pressure zone out of the exit port and through a spinneret, extrusion die, or other means capable of giving the emerging polymer the desired shape. The resulting extruded product is cooled until it is solidified.

As the molten polymer leaves the exit port, it can be passed through a pump capable of delivering it at the desired rate and pressure to the spinneret or extrusion die. Such a pump is often necessary when spinning fine filaments.

The novel process and apparatus have advantageous utility for the manufacture of filaments, films, and other extruded polymer products in a single continuous economical operation. Polymer in solid or molten form can be fed directly from a storage source into the extruder, volatile matter can be removed from the polymer while the polymer is further polymerized within the extruder to a desired higher relative viscosity, and the polymer extruded into the desired shape at an extremely uniform rate and quality.

Better quality and lower cost extruded products are obtainable. The need for conventional flake conditioning processes and devices is eliminated. In fact, feed to the extruder may be direct from a polymerization autoclave. The accurate control of output rate is especially beneficial for filament spinning applications. Output rate can be varied over a wide range from one production run to another. Polymers which already have the desired relative viscosity can be extruded without danger of depolymerization within the extruder. Thus, a product having a predetermined relative viscosity is obtainable either by prevention of depolymerization or by causing a regulated amount of further polymerization. Additives can be effectively blended with the polymer during the extrusion process, and the additives do not have to be entirely free of volatile matter when added.

The invention surprisingly enables the feed rate to be varied over a wide range (e.g., 3 to 10 fold) at a given screw speed without having to change the predetermined setting of the pressure regulator (see Table I below in Examples 4 to 8). It also enables the screw speed to be varied over a substantial range (e.g., 2 to 3 fold) at a given feed rate without having to change the setting of the pressure regulator.

The examples which follow are given for the purpose of illustrating the invention; all parts and percentage figures are on a weight basis unless otherwise specified.

Example 1

Continuous nylon filament is manufactured according to the novel process as follows, which is described in reference to the accompanying drawing. Pressure controller 15 is set at a predetermined pressure of 800 p.s.i.g.; this pressure is first determined to be satisfactory for the particular polymer and apparatus by means of a brief trial run. The details of this controller, or of other type control equipment mentioned hereinafter, form no part of the present invention and a wide variety of equipment is available commercially to provide the indicated functions. Thus any controller that will compare an input signal, representative of a pressure, with a preselected control or set-point pressure and provide an output signal in response to deviation from the set-point can be employed and these may be electronic, pneumatic or the like. A suitable pressure controller is available from Taylor Instrument Company under catalog numbers 700JE–122–100 and 704RE–122, with a control range of 0 to 1500 p.s.i.g.

Nylon 66 flake from drum 1 is moved by means of a pneumatic conveyor 2 to the supply hopper of feeder 3. Feeder 3 is set to feed the nylon flake at the rate of 50 lbs./hr. (22.6 kg./hr.) into the inlet port of twin screw extruder 4. The extruder is of the type described in U.S. Patent 2,670,188. The feed rate is such that the screw channels immediately below the inlet port are not entirely filled with polymer; this is sometimes referred to as "starve feeding."

Extruder 4 melts the flake and maintains the polymer in a molten state at about 290° C. while kneading it intensively. The molten nylon is moved by the two intermeshing kneading screws 24 and 26, shown in the section broken away, and both screws rotate in the same direction in the extruder barrel; the screws advance the polymer through a vacuum zone created by steam jet 5 attached to vent ports 6, 7 and 8. The vacuum at the steam jet is 29 in. (736 mm.) Hg; that is, the pressure is about 1 inch (25.4 mm.) Hg absolute. The vacuum in the vacuum zone is about 28 in. (711 mm.) Hg. The screw channels are not entirely filled with polymer in the vacuum zone; thus, there is no flooding of the vent ports. Water liberated by the nylon as it undergoes further polymerization is removed as a vapor through vent ports 6, 7 and 8.

The molten nylon now passes through a regulated superatmospheric pressure zone wherein a constant melt inventory (supply of molten nylon) is maintained. The pressure zone occupies the portion of the extruder barrel between vent port 8 and the exit port which lies at the point where transfer line 9 is attached to the end of the extruder barrel. Inlet pressure at the pressure zone is noted by detector 28, and is kept low to prevent flooding of the vents. The screw channels in this zone are filled with polymer. It takes the polymer about one minute to travel from the inlet port to the exit port of the extruder. Upon leaving the extruder barrel at the rate of 50 lbs./hr. (22.6 kg./hr.), the molten nylon passes through transfer line 9, pump 22 and spinneret 10.

The pressure on the polymer in the pressure zone is measured by pressure detector 13, which may be a pressure transducer or other pressure sensing means, which senses pressure in the extruder barrel near the exit port. Pressure value signals are transmitted by pressure transmitter 14 from pressure detector 13 to preset pressure regulator 15. A pressure detector and transmitter that may be used is Model No. X726TH191 of the Taylor Instrument Company. In turn, signals indicating any deviation from the present pressure value are transmitted from pressure regulator 15 (e.g., by electronic or pneumatic means) to speed regulator 18 which is a field current adjuster on the motor which rotates the kneading screws. This signal may go directly to the speed regulator 18 or indirectly thereto, passing through a ratio relay 16. The actuation of speed regulator 18 by pressure regulator 15 causes the screw speed to be changed in proper proportion to the deviation in pressure signaled by pressure transmitter 14 to restore the pressure in the pressure zone to the desired constant value. Thus, when pressure detector 13 signals a pressure value slightly above the pressure setting of regulator 15, regulator 15 in cooperation with regulator 18 causes a proportionate decrease in screw speed to restore the pressure in the pressure zone to the preset value. A typical speed regulator that can be used is available commercially as MD–9 from the Louis Allis Company.

Simultaneously, the output signal transmitted by pressure transmitter 14 from pressure detector 13 to pressure regulator 15 is conducted through ratio regulator 16 which provides an output signal to speed regulator 17, the latter being an adjustable speed drive which governs the rate at which feeder 3 introduces nylon flake into the barrel of extruder 4. Model VS Jr. 28705–2 of the Reliance Manufacturing Company can be the speed regulator of the feeder. A suitable ratio regulator that may be used is available from Beckman Instruments as Model No. 10T. The actuation of speed regulator 17 by ratio regulator 16 causes the feed rate to be changed in proportion to the change in screw speed caused by the deviation in pressure signaled by regulator 15, and these changes restore the pressure in the pressure zone to the desired constant value. Thus, when pressure detector 13 signals a pressure value slightly above the pressure setting of regulator 15, regulator 15 in cooperation with ratio regulator 16 and regulator 17 causes a proportionate decrease in rate of feed.

Screws 24 and 26 in one particularly useful screw extruder are made by assembling a plurality of individual screw members keyed to a shaft. By choice of screw pitch and screw widths an assembly is provided that, for example, has fast conveying zones (large screw pitch) that are useful to spread out the molten polymer for devolatilization, and slow conveying zones (low or reverse pitch) that serve to build up polymer inventory in that zone and polymer pressure. As will be apparent, this flexibility in screw characteristics permits the arrangement of disks to provide any desired number of, for example, devolatilization zones in the extruder.

The relative viscosity of the nylon is increased substantially during the process of Example 1, namely, from 43 at the start to 72 at the finish. The output rate and temperature of the polymer leaving the extruder remain surprisingly constant during a prolonged production run; these are important factors in avoiding nonuniform filament properties. The continuous nylon filament emerging from the spinneret is cooled and wound up on a storage spool in a conventional manner.

The resulting filament is characterized by high quality and uniform properties through its entire length. It has excellent tensile strength, dyeability and drawability. The filament is very economically produced in accordance with this example. The prior art need for adjustment of polymer relative viscosity in a separate process, such as flake conditioning, finishing and separating, prior to extrusion is eliminated. The process of Example 1 can be operated for surprisingly long production runs without shutdowns and laborious cleaning out of the apparatus.

Example 2

High-quality nylon filament is produced uniformly and economically by repeating Example 1 except the vacuum at the steam jet is 20 in. (508 mm.) Hg, the nylon flake is fed into the extruder at the rate of 275 lbs./hr. (124 kg./hr.), and the polymer leaving the extruder at the same rate has a relative viscosity of 58.

Example 3

Employing a modification of the process of Example 1 nylon filament is prepared from a 50:50 copolymer of hexamethylene adipamide and hexamethylene sebacamide.

A pressure regulator as described in Example 1 is set at a predetermined value of 1010 p.s.i.g. (pounds per square inch gauge pressure) (71 kg./cm.$^2$), the pressure to be maintained on the polymer immediately upstream of the exit port. The nylon flake is fed at the rate of 62.5 lbs./hr. (28.3 kg./hr.) into an extruder as described in Example 1 from a V-shaped vibrator-equipped supply hopper by means of a 1.5-inch (38 mm.) diameter screw rotating in a trough at the bottom of the hopper and leading to the polymer inlet of the extruder through a nitrogen-blanketed enclosure. The nylon flake has a moisture content of 0.48%, a relatively viscosity of 43.3 and an amine end count of 40. As is known in the art, a high amine end count indicates a low degree of polymerization.

The extruder barrel is heated by means of electrical resistant heaters mounted along the entire length of the barrel exterior, except for a small section near the inlet port which is kept cool with a water jacket.

Within the extruder the nylon is melted, maintained in a molten state at 284° C. while it is kneaded intensively, and moved through a vacuum zone created by a steam jet (barometric condenser) attached to 3 vent ports in the extruder barrel. The vacuum at the steam jet is 28 in. (711 mm.) Hg. Water liberated by the nylon as it continues to polymerize (increase in relative viscosity and molecular weight) within the extruder barrel is removed through the vent ports. The molten nylon now passes through a regulated pressure zone immediately upstream from the exit port.

Upon leaving the extruder barrel at a temperature of 284° C., the molten nylon passes through a transfer line having a 1-inch (25.4 mm.) inside diameter and a heated Dowtherm jacket enroute to a 0.1 gal./min. (0.37 l./min.) meter pump 22 and a filament spinning block 10. The pressure at the inlet of the spinning block pump is maintained at 250 p.s.i.g. (17.5 kg./cm.$^2$). The difference between the pressure zone pressure and the pressure (line 20) at the inlet of the spinning block pump (1010−250=760) or (metric units=71−17.5=53.5) can be continuously recorded as the differential pressure value; this value can be used as a continuous indication of the degree of polymerization of the polymer leaving the extruder. The desired differential pressure value can be maintained by adjustments in the level of vacuum in the vacuum zone (which is governed by the vacuum level at the steam jet); for example, a slight decrease in the pressure within the vacuum zone will cause a slight increase in the degree of polymerization. As the differential pressure value is continuously recorded, the ratio regulator can be used to receive signals of deviation from the desired differential pressure value and to actuate vacuum-adjusting means, i.e., a valve, attached to the steam jet 5 in such proportion to deviations from the desired differential pressure value that the differential pressure value is maintained substantially constant.

The pressure on the polymer in the pressure zone is measured by a pressure detector located near the extruder barrel exit port, and this pressure is kept substantially constant in the manner described in Example 1.

Contrary to many prior art processes, there is no tendency towards troublesome bridging of solid polymer from side to side of the extruder barrel interior near the feed end.

The product emerging from the spinneret is a continuous nylon filament of excellent and uniform quality having a relative viscosity of 69.4 and an amine end count of 24.

Examples 4–8

Nylon filaments are prepared in the manner described in Example 3, except for the modifications shown in Table I.

TABLE I

| Example | 4 | 5 | 6 | 7 | 8 |
|---|---|---|---|---|---|
| Feed Rate, lbs./hr | 80 | 245 | 75 | 146 | 80.5 |
| Feed Rate, kg./hr | 36.2 | 111 | 34 | 66 | 36.5 |
| Feed Moisture, Percent | 0.49 | 0.48 | 0.97 | 0.73 | 5.7 |
| Feed Relative Viscosity | 43.6 | 41.5 | 46.2 | 45.5 | 44.0 |
| Product Relative Viscosity | 62.1 | 65.4 | 72.2 | 72.3 | 62.9 |
| Feed Amine Ends | 37 | 38 | 40 | 35 | 46 |
| Product Amine Ends | 25 | 27 | 22 | 23 | 33 |
| Screw Speed, r.p.m. | 91 | 110 | 105 | 112 | 100 |
| Pressure Zone, p.s.i.g. | 1,020 | 1,000 | 1,180 | 1,180 | 940 |
| Pressure Zone, kg./cm.$^2$ | 71.5 | 70.0 | 82.7 | 82.7 | 66.0 |
| Vacuum at jet in. Hg | 24.5 | 28.0 | 29.0 | 29.0 | 27.5 |
| Vacuum at jet mm. Hg | 622 | 711 | 736 | 736 | 699 |
| Spinning Block Pump Inlet, p.s.i.g. | 300 | 380 | 300 | 300 | 370 |
| Spinning Block Pump Inlet, kg./cm.$^2$ | 21.0 | 26.5 | 21.0 | 21.0 | 26.0 |

In Examples 4–7 the polymer and extrusion temperature are the same as in Example 3. In Example 8 the polymer is poly(hexamethylene adipamide) and the polymer leaves the extruder barrel at a temperature of 300° C.

From the foregoing discussion and data, it is evident that the present invention is a particularly useful advance in the continuous production of extruded products. While the discovery has been described with respect to certain details, it will be evident that the invention can be otherwise practiced without departing from its scope.

I claim:

1. A process for manufacturing extruded products from a fusible polymer which comprises continuously feeding a fusible polymer into a screw-type extruder, maintaining the polymer in a molten state in the extruder at a selected temperature, continuously kneading the molten polymer intensively in the extruder, continuously passing the kneaded molten polymer through a vacuum zone and removing volatile matter from the polymer in that zone through a vent port, continuously passing the polymer relatively free from volatile matter through a melt inventory zone to an outlet from said extruder, maintaining the inlet pressure at said melt inventory zone sufficiently low to prevent polymer flooding said vent port, continuously measuring the pressure at the outlet of said extruder, and simultaneously and automatically adjusting the rate at which polymer is fed into the extruder and the extruder screw speed continuously in such proportion to said outlet pressure that said pressure is maintained substantially constant at a predetermined level.

2. A process as described in claim 1 wherein said fusible polymer is a synthetic linear condensation polymer and the volatile matter removed from the extruder through the vent port is matter liberated by polymerization of the polymer within the extruder, and the vacuum in said vacuum zone is automatically adjusted in response to the viscosity of polymer passed from the outlet of the extruder.

3. A process as described in claim 1 wherein said fusible polymer is a synthetic linear condensation polymer, and additives are incorporated therein by addition to the polymer in said extruder prior to passage to the vacuum zone.

References Cited

UNITED STATES PATENTS

| 2,540,146 | 2/1951 | Stober | 264—40 |
| 3,156,009 | 11/1964 | Alsys | 18—12.5 |
| 3,193,877 | 7/1965 | Edwards | 18—12.5 |
| 3,257,173 | 6/1966 | Parnell | 18—12.5 |
| 3,305,894 | 2/1967 | Boden et al. | 18—12.5 |

DONALD J. ARNOLD, *Primary Examiner.*